United States Patent
Gulde et al.

(10) Patent No.: US 12,372,353 B2
(45) Date of Patent: Jul. 29, 2025

(54) METHOD FOR DETERMINING THE CAPABILITY OF A SENSOR CONTAINED IN A SATELLITE TO ACCESS A TARGET REGION, AND SATELLITE ACCESSING SYSTEM

(71) Applicant: FRAUNHOFER-GESELLSCHAFT ZUR FÖRDERUNG DER ANGEWANDTEN FORSCHUNG E. V., Munich (DE)

(72) Inventors: Max Gulde, Freiburg (DE); Clemens Horch, Freiburg (DE); Frank Schäfer, Freiburg (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 870 days.

(21) Appl. No.: 17/615,876

(22) PCT Filed: Jun. 3, 2020

(86) PCT No.: PCT/EP2020/065339
§ 371 (c)(1),
(2) Date: Dec. 2, 2021

(87) PCT Pub. No.: WO2020/245193
PCT Pub. Date: Dec. 10, 2020

(65) Prior Publication Data
US 2022/0306322 A1    Sep. 29, 2022

(30) Foreign Application Priority Data

Jun. 4, 2019   (DE) ................. 10 2019 208 112.6

(51) Int. Cl.
*H04L 1/00*      (2006.01)
*G01C 11/02*     (2006.01)
(Continued)

(52) U.S. Cl.
CPC .............. *G01C 11/02* (2013.01); *G01S 19/42* (2013.01); *B64G 1/1028* (2023.08)

(58) Field of Classification Search
CPC .... G06K 9/0063; G06V 40/171; G06F 30/20; G06F 16/9577; G08G 1/143; H04W 4/40; B64G 1/1021; G01C 11/02
See application file for complete search history.

(56) References Cited

U.S. PATENT DOCUMENTS

| 4,809,935 A | 3/1989 | Draim |
| 9,869,766 B1* | 1/2018 | Breiholz ............... G01S 13/106 |
| 2011/0115902 A1* | 5/2011 | Jiang .................... H04W 4/026 |
| | | 348/E7.091 |

FOREIGN PATENT DOCUMENTS

| CN | 109029367 A | 12/2018 |
| WO | WO 2011/089477 A1 | 7/2011 |

OTHER PUBLICATIONS

Euroconsult (Euroconsult-ec.com), Press Release: https://www.euroconsult-ec.com/press-release/euroconsult-research-projects-smallsat-market-to-nearly-quadruple-over-next-decade/ (2019) "Prospects for the Small Satellite Market," https://mo.us4.list-manage.com/pages/track.click?u=4914ed69943a2493fa1664615&id=6781160953 Extract downloaded Aug. 11, 2022 (22 pgs).

(Continued)

*Primary Examiner* — Phuoc H Doan
(74) *Attorney, Agent, or Firm* — Leydig, Voit & Mayer, Ltd.

(57) ABSTRACT

The invention relates to a method and a system for determining the capability of a sensor contained in a satellite to access a target region. The position of the satellite is ascertained, the viewing radius of the sensor in the direction of a target reference point in a target region is then determined, the extension of the target region in the direction of a satellite position point is ascertained, and the sensor is (Continued)

determined to be capable of accessing the target region if the distance between the satellite position point and the target reference point in the target region is less than or equal to the sum of the viewing radius of the sensor and the extension of the target region in the direction of the target reference point.

12 Claims, 7 Drawing Sheets

(51) Int. Cl.
  *G01S 19/42* (2010.01)
  *B64G 1/10* (2006.01)

(56) References Cited

OTHER PUBLICATIONS

Lan et al., "Prediction and analysis of orbital target's visibility based on space-based optics observation," *Opto-Electronic Eng* 35(12): 23-27 (2008) Abstract only.

Sandau, "Status and trends of small satellite missions for Earth observation," *Acta Astronaut* 66(1-2): 1-12 (2010).

Adriaens et al., "Optimal Worst-Case Coverage of Directional Field-of-View Sensor Networks," *2006 3rd Annual IEEE Communications Society on Sensor and Ad Hoc Communications and Networks*, pp. 336-345 (2006).

Beste, "Design of Satellite Constellations for Optimal Continuous Coverage," *IEEE Transactions on Aerospace and Electronic Systems AES*—14(3): 466-473 (1978).

Ji et al., "A method for spatial effective coverage analysis in space-based optical observation," *Optik* 166: 116-126 (2018).

Lüders, "Satellite Networks for Continuous Zonal Coverage," *ARS J* 31(2): 179-184 (1961).

Maisonobe et al., "Orekit: an Open-source Library for Operational Flight Dynamics Applications," ICATT 2010, ESAC—Madrid, Apr. 2010 (11 pgs.).

Maisonobe et al., "Orekit: an Open-source Library for Operational Flight Dynamics Applications—Abstract," ICATT 2010, ESAC—Madrid, Apr. 2010 (1 pg.).

Marinan, "From CubeSats to Constellations: Systems Design and Performance Analysis," submitted to the Department of Aeronautics and Astronautics in partial fulfillment of the requirements for the degree of Master of Science in Aeronautics and Astronautics at the Massachusetts Institute of Technology, Sep. 2013 (111 pgs). https://dspace.mit.edu/handle/1721.1/85807.

Quan et al., "Satellite Constellation Design with Adaptively Continuous Ant System Algorithm," *Chinese Journal of Aeronautics* 20: 297-303 (2007).

Sandau et al., "Small satellites for global coverage: Potential and limits," *ISPRS Journal of Photogrammetry and Remote Sensing* 65: 492-504 (2010).

Sciré et al., "Analysis of orbit determination for space based optical space surveillance system," *Advances in Space Research* 56(3): 421-428 (2015).

Sharma, "Space-Based Visible Space Surveillance Performance," Journal of Guidance, Control, and Dynamics 23(1): 153-158 (2000).

Ulybyshev, "Satellite Constellation Design for Complex Coverage," *Journal of Spacecraft and Rockets* 45(4): 843-849 (2008).

Vincenty, "Direct and Inverse Solutions of Geodesics on the Ellipsoid With Application of Nested Equations," Survey Review XXII, 176, Apr. 1975.

Walton, "Models for the Management of Satellite-Based Sensors" *Ph.D. Thesis, Sloan School of Management, Massachusetts Institute of Technology*, pp. 1-180 (1993) Retrieved from the Internet: https://dspace.mit.edu/handle/1721.1/12546.

European Patent Office, International Search Report in International Application No. PCT/EP2020/065339 (Sep. 4, 2020).

European Patent Office, Written Opinion in International Application No. PCT/EP2020/065339 (Sep. 4, 2020).

International Bureau of WIPO, International Preliminary Report on Patentability in International Application No. PCT/EP2020/065339 (Dec. 7, 2021).

\* cited by examiner

METHOD FOR DETERMINING THE CAPABILITY OF A SENSOR CONTAINED IN A SATELLITE TO ACCESS A TARGET REGION, AND SATELLITE ACCESSING SYSTEM

CROSS-REFERENCE TO RELATED APPLICATIONS

This patent application is the U.S. national phase of International Application No. PCT/EP2020/065339, filed on Jun. 3, 2020, which claims the benefit of German Patent Application No. 10 2019 208 112.6, filed Jun. 4, 2019, the disclosures of which are incorporated herein by reference in their entireties for all purposes.

The invention relates to a method and to a system for determining the possibility of a sensor contained in a satellite to access a target region. In this method and system, a position of the satellite is identified, then a view radius of the sensor in the direction of a target reference point in a target region is determined, an extension of the target region in the direction of a satellite position point is identified, and it is determined that there is the access possibility when the distance between the satellite position point and the target reference point in the target region is less than or equal to the sum of the view radius of the sensor and the extension of the target region in the direction of the target reference point.

Remote sensing from space is an invaluable tool for quantitatively and qualitatively understanding the state of our planet and it facilitates a large number of fundamental applications across almost all technology sectors [R. Sandau, "Status and trends of small satellite missions for Earth observation," Acta Astronaut., vol. 66, no. 1-2, pp. 1-12, 2010].

In comparison with ground-based technologies, the most notable advantage of satellite Earth observation is that very large areas can be recorded and analysed in short intervals.

It is expected that there will be huge market expansion especially in the field of small satellites with a mass of up to 500 kg [Euroconsult, "Prospects for the Small Satellite Market," 2017.]; in the next ten years, it is expected that approximately 7000 small satellites and microsatellites will be launched, compared with 1200 satellites within the last decade. The fields of technology stretch from communication and Earth observation through to vessel tracking and IoT (internet of things) applications. Most of all, several mega-constellations are intended to be set up, that is to say swarms of several hundred to a few thousand satellites which are almost structurally identical and together perform the same task (e.g., Starlink and OneWeb). The market is accordingly large; up to 2027, estimated funding of approximately 38 billion USD is required for the construction (60%) and launch (40%) of small satellites alone.

A central parameter for the design of homogeneous and heterogeneous constellations is the coverage quality, i.e., the spatial resolution that can be achieved on the ground and the time characteristics of the sensor access [J. Adriaens, S. Megerian, and M. Potkonjak, "Optimal worst-case coverage of directional field-of-view sensor networks," 3rd Annu. IEEE Commun. Soc. Sens. Adhoc Commun. Networks, Secon 2006, vol. 1, no. C, pp. 336-345, 2007]. Homogeneous constellations consist of a large number of satellites of a very similar type or even of the same type; an example of this would be the Dove Constellation by Planet Labs. By contrast, heterogeneous constellations consist of a quantity of any type of satellite which perform one or more tasks together as a group. This is especially the case if information retrieval from data fusion of a plurality of sensors is sought (smart farming) or time criticality is of overriding importance (e.g., catastrophe management, military applications).

Every satellite in orbit has its own position, orientation and sensor alignment as well as specific sensor parameters such as field of view (FoV) or resolution in optical sensors.

For an application (e.g., the design of a satellite constellation), one or more regions $R_i$ are to be recorded by sensors $S_j$ that are in orbit. Specifically, the aim is to find out which sensor $S_j$ on board which satellite can observe which portion of the region $R_i$ in a defined time interval or at a defined point in time. Furthermore, it is of interest at what points in time a plurality of sensors $S_j$ have the possibility of viewing a region $R_i$ at (almost) the same time.

There is a range of analytical and numerical approaches to solving this problem.

The analytical solutions attempt to model the coverage of the Earth's surface by means of a generic sensor on the basis of geometric simplifications [D. C. Beste, "Design of Satellite Constellations for Optimal Continuous Coverage," IEEE Trans. Aerosp. Electron. Syst., vol. AES-14, no. 3, pp. 466-473, 1978], R. D. Lüders, "Satellite Networks for Continuous Zonal Coverage," ARS J., vol. 31, no. 2, pp. 179-184, 1961]. The aim is primarily to make a statement on the relative positioning of a plurality of satellites and the requirements placed on the payload thereof in order to draw conclusions therefrom on the design of a constellation. These methods are very rapid, but in the above-mentioned examples only allow for geometrically simple, in particular circular, FoVs and are usually based on the same sensor characteristics for all satellites involved. Otherwise, the calculations very quickly become very unclear and numerical methods are more suited to generating a statement.

Furthermore, no propagation or only very simple propagation of the sensor over the Earth's surface is performed, and therefore time-dependent statements are difficult to make. It therefore cannot be calculated, or can only be calculated in a circuitous manner, when exactly a sensor $S_j$ has access to a target region $R_i$.

For this reason, numerical approaches are often used to calculate sensor coverage. To do this, the target region $R_i$ is divided into a network of sub-regions $A_{i,k}$. For each of the individual meshes k, it is then individually calculated whether or not this is in the field of view of the sensor [J. Adriaens, S. Megerian, and M. Potkonjak, "Optimal worst-case coverage of directional field-of-view sensor networks," 3rd Annu. IEEE Commun. Soc. Sens. Adhoc Commun. Networsk, Secon 2006, vol. 1, no. C, pp. 336-345, 2007], [P. Parraud, "OREKIT: AN OPEN SOURCE LIBRARY FOR OPERATIONAL FLIGHT DYNAMICS APPLICATIONS," 2010, Y. Ulybyshev, "Satellite Constellation Design for Complex Coverage," J. Spacecr. Rockets, vol. 45, no. 4, 2008]. The advantage of numerical approaches is the high possible level of geometric and physical complexity that can be simulated. This provides the option of incorporating a digital elevation model in order to correctly take shadowing into account (mountain valleys, street canyons). In addition, depending on the sensor type, other properties such as passage through the atmosphere (e.g., by ray tracing), scattered light due to solar reflections (electro-optical sensors) or airglow (thermal radiation from the Earth's surface) can be incorporated into the calculation. A drawback of the described methodology, however, is the high level of computing complexity involved for such networks, in particular with a geometrically complex field of view of the sensor, a high number of satellites being considered, or large-area target regions. Current software that has implemented such an approach, e.g., AGI's System Tool Kit (STK), the CSIAPS tool from the Canadian DRDC or the free open-source Orekit library, therefore needs long computing times for accordingly complex analyses. The computing complexity also increases as a quadratic function of the size of the target region at a constant accuracy of the calculations. Therefore, for the access during an interval of 72 hours to be surveyed and approximately 100 satellites, CSIAPS requires several hours to calculate the coverage. The resources required, such as memory, also increase rapidly with the number of satellites/sensors to be surveyed.

As an alternative, the problem can be inverted and the access analysis can be carried out from the standpoint of the target [C.-Z. Lan, J.-S. Li, S.-J. Ma, and Q. Xu, "Prediction and analysis of orbital target's visibility based on space-based optics observation," Guangdian Gongcheng/Opto-Electronic Eng., vol. 35, no. 12, 2008.]. Here, it is also possible to incorporate other physical models in order to improve the results. This approach is most suitable for point targets, however, with larger regions involving the same drawbacks as conventional numerical methods.

The problem addressed by the present invention is to facilitate and assess rapid determination of capabilities for potential sensor access, preferably for a large number of satellites. In this process, the spatial and temporal coverage can preferably be facilitated by a large number of any type of sensor.

The problem is solved by the method for determining the possibility of a sensor contained in a satellite to access a target region and by the satellite access system according to the invention described herein. Advantageous developments of the method according to the invention for determining the possibility of a sensor contained in a satellite to access a target region and of the satellite access system are also described.

According to the invention, a method is provided which determines whether a sensor contained in a satellite has the possibility to access a target region. The sensor is installed in the satellite here and can take measurements of the Earth's surface and/or atmosphere. The sensor contained in the satellite thus observes the Earth. Sensor access or access of the sensor to a target region is understood to mean that the sensor can carry out its intended observation or measurement in the target region. If, for example, the sensor is a camera, this means that the sensor has access to the target region or can access the target region such that it can capture images of the target region. The target region is an area of the Earth's surface here.

A sensor normally has a field of view which is that region of the Earth's surface which the sensor can observe at a given satellite position or in a given orientation of the sensor, i.e., that region from which the sensor can capture measured values or images at a given satellite position and in a given orientation of the sensor. That region which is accessible to the sensor at a given position of the satellite is to be referred to as a field of regard (FoR). The field of regard is thus the total amount of all the fields of view of the sensor at a given satellite position for all the alignments of the sensor in question.

In the method according to the invention, at least one position of the satellite is first identified. It is then identified whether there is visual contact between the satellite and the target region. It is thus determined according to the invention whether there is a direct line of sight between the satellite and the target region. It is assumed here that only when there is visual contact is sensor access even possible.

The target region is understood to be a section of the Earth's surface which the sensor can access. In practice, it is then desired, for example, to obtain measurement results from the sensor for a particular region of the Earth's surface, the target region. The method according to the invention makes it possible to determine whether or not this is possible for the given target region at a given point in time. The method according to the invention may advantageously also be used to determine when the access to the target region is possible.

If there is a direct line of sight between the satellite and the target region, the following process is carried out according to the invention.

An angle $\phi$ is determined between a satellite reference direction and a target direction directed towards a target reference point in the target region about a satellite position point dependent on the position of the satellite. Here, the satellite reference direction may be a direction on the Earth's surface which is fixed relative to the satellite. For example, the satellite reference direction may be the propagation direction of the satellite, i.e., the movement direction of the satellite or its projection onto the Earth's surface. In particular, the satellite reference direction may for example be the movement direction of the nadir of the satellite on the Earth's surface.

Where reference is made to the Earth's surface in this document, this can mean the actual Earth's surface or a suitable approximation of the Earth's surface, i.e., a spherical shape adapted to the Earth's surface or a suitable reference ellipsoid, for example.

The target reference point may in principle be any point within the target region. Advantageously, the target reference point may be the geometric centroid of the target region if this is within the target region. The target region is preferably mathematically simply connected here, i.e., it preferably should not have any holes.

The angle $\phi$ is determined about a satellite position point dependent on the position of the satellite. It is therefore assumed that the satellite reference direction originates from the satellite position point and that the target direction likewise originates from the satellite position point. The angle $\phi$ is then between these directions. In an advantageous configuration of the invention, the satellite position point may be the nadir of satellite, i.e., the point on the Earth's surface directly below the satellite. Here, the nadir can be understood to be that point on the Earth's surface which results from projecting the satellite onto the Earth's surface in the direction perpendicular to the Earth's surface.

According to the invention, a view radius $R_{sensor}(\phi)$ of the satellite in the direction of the angle $\phi$ is then determined starting from the satellite position point. The view radius $R_{sensor}(\phi)$ is therefore the maximum distance, starting from the satellite position point, which the sensor can reach on the Earth's surface at a given satellite position. Here, the view radius $R_{sensor}(\phi)$ has been referred to as the view radius $R_{sensor}(\phi)$ of the satellite. This view radius $R_{sensor}(\phi)$ could also be referred to as the view radius $R_{sensor}(\phi)$ of the sensor.

According to the invention, an angle $\gamma$ is also determined between a reference direction and a direction directed towards the satellite position point about the target reference point. The reference direction is a direction that is fixed relative to the target region or the Earth's surface here. For example, the reference direction may be the north direction. The target reference point is the above-described target reference point. The angle $\gamma$ is advantageously also determined between the north direction on the Earth's surface as a reference direction and a direction pointing from the target reference point towards a nadir of the satellite. The nadir may advantageously be the satellite reference point here.

An extension RoT ($\gamma$) of the target region in the direction of the angle $\gamma$ can then be determined starting from the target reference point. The extension RoT ($\gamma$) thus describes the distance starting from the target reference point over which the target region extends in the direction of the satellite position point.

Both the target region and also the sensor field of view are converted into polar coordinates. This allows the regions to be mathematically described very simply and accurately even with complex geometric shapes (in particular if they are mathematically simply connected, as explained above).

It should be noted that the angles $\phi$ and $\gamma$ as well as the view radius $R_{sensor}$ ($\phi$) and the extension RoT ($\gamma$) can be determined in any order, and also simultaneously.

It can then be determined whether the sensor has the possibility to access the target region. Here, it is determined that there is this possibility if a distance between the satellite position point and the target reference point is less than or equal to the sum of the view radius $R_{sensor}$ ($\phi$) of the satellite and the extension RoT ($\gamma$) of the target region in the direction of the angle $\gamma$, i.e., in the direction of the satellite position point.

It should be noted that "distance" can always be understood to mean distances on the Earth's surface or on the approximation of the Earth's surface that is being used. If the Earth's surface is approximated with a sphere, the distances are thus the lengths of circle segments of great circles on the surface of the corresponding sphere. In general, a distance is always the shortest connection on the Earth's surface between the points in question in the corresponding approximation.

In an advantageous configuration of the invention, a region of regard of the sensor can be represented by an ellipse or a polygon in order to determine the view radius $R_{sensor}$ ($\phi$). The ellipse or polygon represents an approximation of the region of regard. As described, the region of regard is that region of the Earth's surface which can be reached by the sensor from the position of the satellite. By the approximation in the form of an ellipse or polygon, the distance between the satellite reference point and the ellipse or between the satellite reference point and the polygon in the direction of the angle $\phi$ can then be determined as the view radius $R_{sensor}$ ($\phi$). This configuration is very advantageous since it makes it possible to identify the view radius $R_{sensor}$ ($\phi$) using a very simple calculation when the angle $\phi$ is known. Representing the region of regard by an ellipse or polygon thus significantly accelerates the determination of the access possibility.

In a particularly advantageous configuration of the invention, the view radius $R_{sensor}$ ($\phi$) can be determined by reference being made to a table or function which assigns values of the angle $\phi$ to values of the view radius. It is particularly preferred here for the table or function to assign values of the angle $\phi$ to reference view radii ($\phi$). The angle $\phi$ is thus predetermined, and the reference view radius RoR ($\phi$) is then determined from the table or by means of the function.

The view radius $R_{sensor}$ ($\phi$) that the sensor would have when the satellite is at a reference altitude $a_{ref}$ can be understood to be the reference view radius RoR ($\phi$) here. The view radius $R_{sensor}$ ($\phi$) can then be calculated from the reference view radius RoR ($\phi$) by means of the current altitude a of the satellite as $R_{sensor}$ ($\phi$))=RoR ($\phi$) $a/a_{ref}$. The table or function can preferably be compiled before the start of the method. This configuration of the invention likewise makes it possible to significantly accelerate the method according to the invention, since the assignment between values of the angle $\phi$ and the view radii $R_{sensor}$ ($\phi$) or the reference view radii RoR ($\phi$) only has to be performed once before the start of the method. Later in the method, $R_{sensor}$ ($\phi$) or RoR ($\phi$) thus only has to be read out from the table or identified by means of the simple function. All the functions by means of which the predetermined value pairs can be approximated, for example a suitable polynomial, are possible as the function.

In an advantageous configuration of the invention, the extension RoT ($\gamma$) of the target region in the direction of the angle $\gamma$ can be determined by the target region being represented as an ellipse or polygon. The distance between the target reference point and this ellipse or polygon in the direction of the angle $\gamma$ can then be determined as the extension RoT ($\gamma$). This configuration allows the method according to the invention to be significantly accelerated, since said distance between the point and the ellipse or polygon is possible by means of simple calculations. Representing the target region as an ellipse or polygon may be an approximation of the target region, but it is also possible to define the target region as an ellipse or polygon from the outset. The distance between the target reference point and an ellipse or polygon can be determined in a mathematically simple and rapid manner.

In a particularly preferred configuration of the invention, the extension RoT ($\gamma$) of the target region can be identified from a table or function in which values of the extension RoT of the target region are assigned to values of the angle $\gamma$. The table or function can advantageously be compiled before the start of the method. This also means that the method is significantly accelerated, since the corresponding extension RoT ($\gamma$) can be identified from a given angle $\gamma$ just by looking up or evaluating a simple approximation function, such as a polynomial. If the table or function is predetermined, no further complicated calculations need to be performed in order to actually determine the access possibility.

The method according to the invention provides that the position of the satellite is identified. Advantageously, it can be identified in a time-dependent manner. Since the orbit data of satellites are normally known, there are a large number of options for position determination. If the method is to be carried out rapidly and the calculation is to be kept simple, coordinates of the satellite can first be identified at a first point in time and at a second point in time, and the positions of the satellite can be determined for a plurality of points in time between the first point in time and the second point in time. It can then be determined for this plurality of points in time whether there is access possibility. It is also optionally possible for other positions to determine the access possibility by the position of the satellite being interpolated between two of the plurality of points in time. In the simplest case, said first point in time can be the point in time at which the satellite goes above the horizon when viewed from the target reference point, i.e., the point in time at which the satellite has an elevation of 0° when viewed from the target reference point. It is, however, also possible to select a later point in time as the first point in time, for example a point in time at which the satellite has an elevation of 20° or 30°, meaning that the computing time is reduced further.

A point in time at which the satellite disappears behind the horizon can be used as the second point in time, i.e., a point in time at which the satellite has an elevation of 0° when viewed from the target reference point. An earlier point in time than the second point in time can also be used, however, at which the satellite has an elevation of 30°, preferably 20°, when viewed from the target reference point. The optimal elevation can advantageously be determined before calculation by looking up how large the maximum view angle of the satellite to be surveyed can be. If this is very small, for example 10°, an accordingly high minimal elevation can be expected (in this case therefore less than or equal to 80°) in order to make it possible to further accelerate the procedure.

In an advantageous configuration of the invention, an overlap or overlap area between a region of regard FoR of the satellite and the target region can be determined. In a particularly preferred configuration, this overlap area can be calculated as an overlap area of a circle having the radius $R_{sensor}$ ($\phi$) about the satellite position point and a circle having the radius RoT ($\gamma$) about the target reference point. The size of the overlap area can therefore be estimated as the intersection of these two circles. The overlap can then come about as the area of the intermediate lens-shaped portion as a function of the distance between the two centres of the circles, which is said distance between the satellite position point and the target reference point. The overlap A can be estimated as follows, for example:

$$A_1 = RoT_{Avg}^2 \mathrm{acos}\left(\frac{D_{ji}^2 + RoT(\gamma)^2 - R_{Sensor}(\phi)^2}{2D_{ji}RoT(\gamma)}\right)$$

$$A_2 = RoR^2 \mathrm{acos}\left(\frac{D_{ji}^2 + R_{Sensor}(\phi)^2 - RoT(\gamma)^2}{2D_{ji}R_{Sensor}(\phi)}\right)$$

$$A_3 = (-D_{ji} + RoT(\gamma) + R_{Sensor}(\phi))(D_{ji} + RoT(\gamma) - R_{Sensor}(\phi))(D_{ji} - RoT(\gamma) + R_{Sensor}(\phi))(D_{ji} + RoT(\gamma) + R_{Sensor}(\phi))$$

$$A = A_1 + A_2 - \frac{1}{2}\sqrt{A_3}$$

Depending on the complexity of the surface geometries, the overlap can be estimated by this means. Since the projected position of the satellite, i.e., the satellite position point, is subject to uncertainties anyway, the accuracy of the overlap is usually sufficient. It can give an important indication of the overlap to be expected and especially of whether this only relates to a small part of the target region and is therefore possibly not of interest to a user.

In an advantageous configuration of the invention, the method can also include determining a current resolution of the sensor, abbreviated to Res here. The current resolution of the sensor can then be approximated as $$Res = \frac{Res_{Ref}\sqrt{D_{ji}^2 + a^2}}{a_{Ref}}$$

where $Res_{ref}$ is a resolution of the sensor at a reference altitude $a_{ref}$ of the satellite, a is the current altitude of the satellite, and $D_{ij}$ is a distance between the target reference point i and the current satellite position point j, measured on the Earth's surface. In this way, a user can not only determine whether satellite access is possible at a given time but also whether the desired accuracy or resolution can be obtained here.

The method according to the invention can advantageously be configured such that a target point in time is predetermined and the position of the satellite and the angle $\phi$, the view radius $R_{sensor}$ ($\phi$) and the angle $\gamma$ are then determined at the target point in time. In this way, it can be determined whether the sensor contained in the satellite has the possibility to access the target region at the target point in time. It is, however, also possible to configure the method such that it determines at which points in time there is the access possibility, or such that it determines at which point in time the access possibility begins and at which point in time it ends. Irrespective of how the method is configured, the above-described steps can each be performed for the points in time in question.

As the result, the method can advantageously output the information that there is no access possibility when it is determined that there is no direct line of sight between the satellite and the target region or between the satellite and the target reference point at the point in time in question. In this way, individual satellites or even whole constellations in which there is no line of sight can be rapidly excluded from further consideration.

According to the invention, a satellite access system is also provided which makes it possible to determine the possibility of a sensor contained in a satellite to access a target region. According to the invention, this satellite access system comprises a position-identification unit, by means of which at least one position of the satellite is identified. The satellite access system also comprises an overlap-determining unit, also called an access-possibility determining unit, which is configured to determine an angle $\phi$ between a satellite reference direction and a target direction directed towards a target reference point in the target region about a satellite position point dependent on the position of the satellite. The overlap-determining unit is also configured to determine a view radius $R_{sensor}$ ($\phi$) of the satellite in the direction of the angle $\phi$ starting from the satellite position point. It is also configured to determine an angle $\gamma$ between a reference direction and a direction directed towards the satellite position point about the target reference point and to determine an extension RoT ($\gamma$) of the target region in the direction of the angle $\gamma$ starting from the target reference point.

The overlap-determining unit is then configured to determine that there is access possibility if a distance between the satellite position point and the target reference point is less than or equal to the sum of the view radius $R_{sensor}$ ($\phi$) of the satellite and the extension RoT ($\gamma$) of the target region in the direction of the angle $\gamma$.

In this case, the position-identification unit and/or the overlap-determining unit can be formed by a computer and/or a processor or processor unit programmed to carry out said steps. Units of this kind can generally be referred to as control units, for example.

The satellite access system according to the invention is preferably configured to perform the above-described method for determining the possibility of a sensor contained in a satellite to access a target region.

BRIEF DESCRIPTION OF THE DRAWINGS

The invention will be explained in the following by way of example with reference to a number of figures, in which:

FIG. 1A-1B show a field of regard of a satellite, wherein FIG. 1A illustrates a plan view and FIG. 1B illustrates a perspective view.

DETAILED DESCRIPTION OF THE INVENTION

Figure 1B:
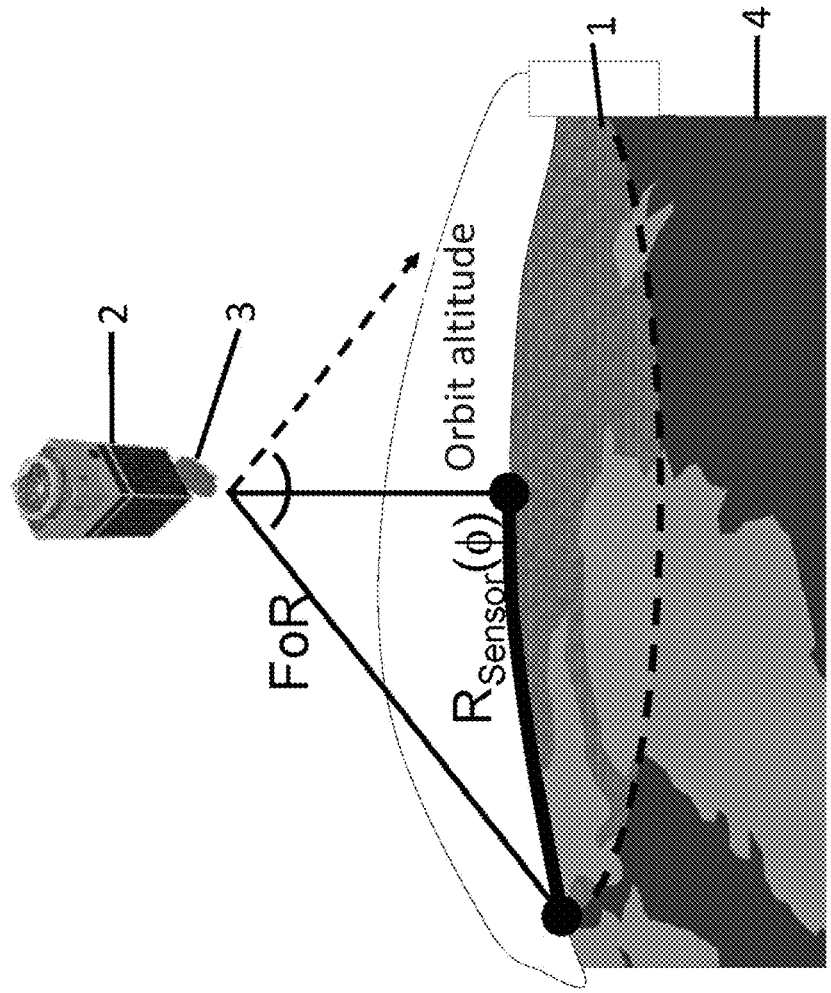
Figure 1A:
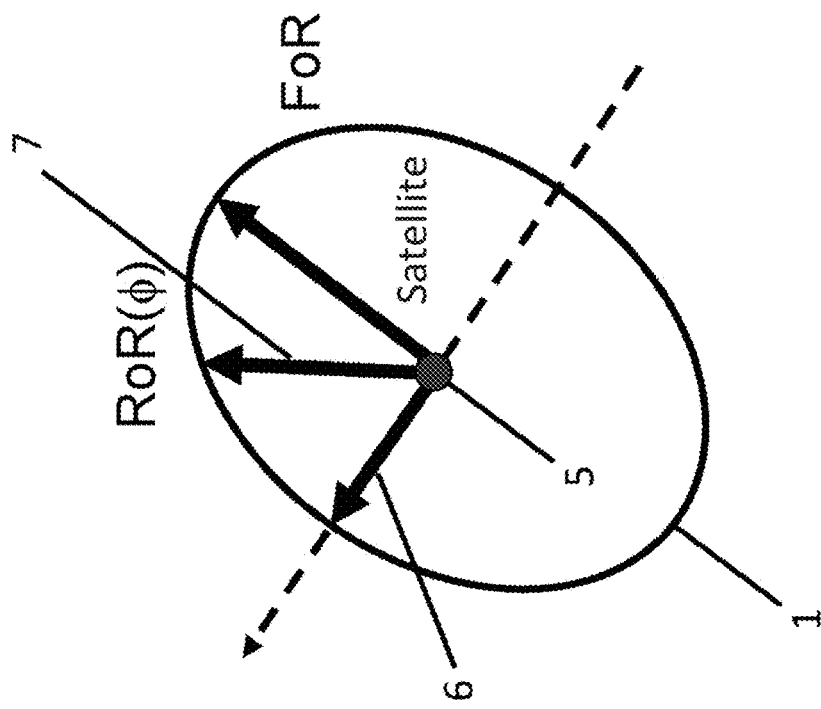

FIG. 1A-1B show a field of regard FoR 1 of a satellite 2, with FIG. 1A showing a plan view and FIG. 1B showing a perspective view. The field of regard 1 is the region which is accessible to a sensor 3 of the satellite 2 at a given position of the satellite which the sensor can thus access. In the example shown in FIG. 1A-1B, the region of regard 1 is approximated by an ellipse which extends on the surface of the Earth 4 about a nadir 5 of the satellite. The nadir 5 represents a satellite position point on the Earth's surface 4 here. A target direction 7 directed towards a target reference point 9 in a target region 8 encloses an angle $\varphi$ with a satellite reference direction 6, which may for example be the direction of movement of the nadir 5 on the Earth's surface. The distance between the satellite reference point 5 and the outer boundary of the region of regard 1, i.e., the ellipse 1 here, is referred to as the reference view radius RoR ($\varphi$). In this case, the reference view radius RoR ($\varphi$) is the distance between the satellite position point 5 and the edge of the region of regard when the satellite 2 is at a reference altitude $a_{ref}$.

The reference altitude $a_{ref}$ is marked as the orbit altitude in FIG. 1B. When the satellite 2 is at any altitude a, the distance between the satellite position point 5 and the resulting boundary of the region of regard 1 can be calculated as $R_{sensor}(\phi) = \text{RoR}(\phi)\, a/a_{ref}$ from RoR ($\phi$) in a good approximation.

Figure 2:
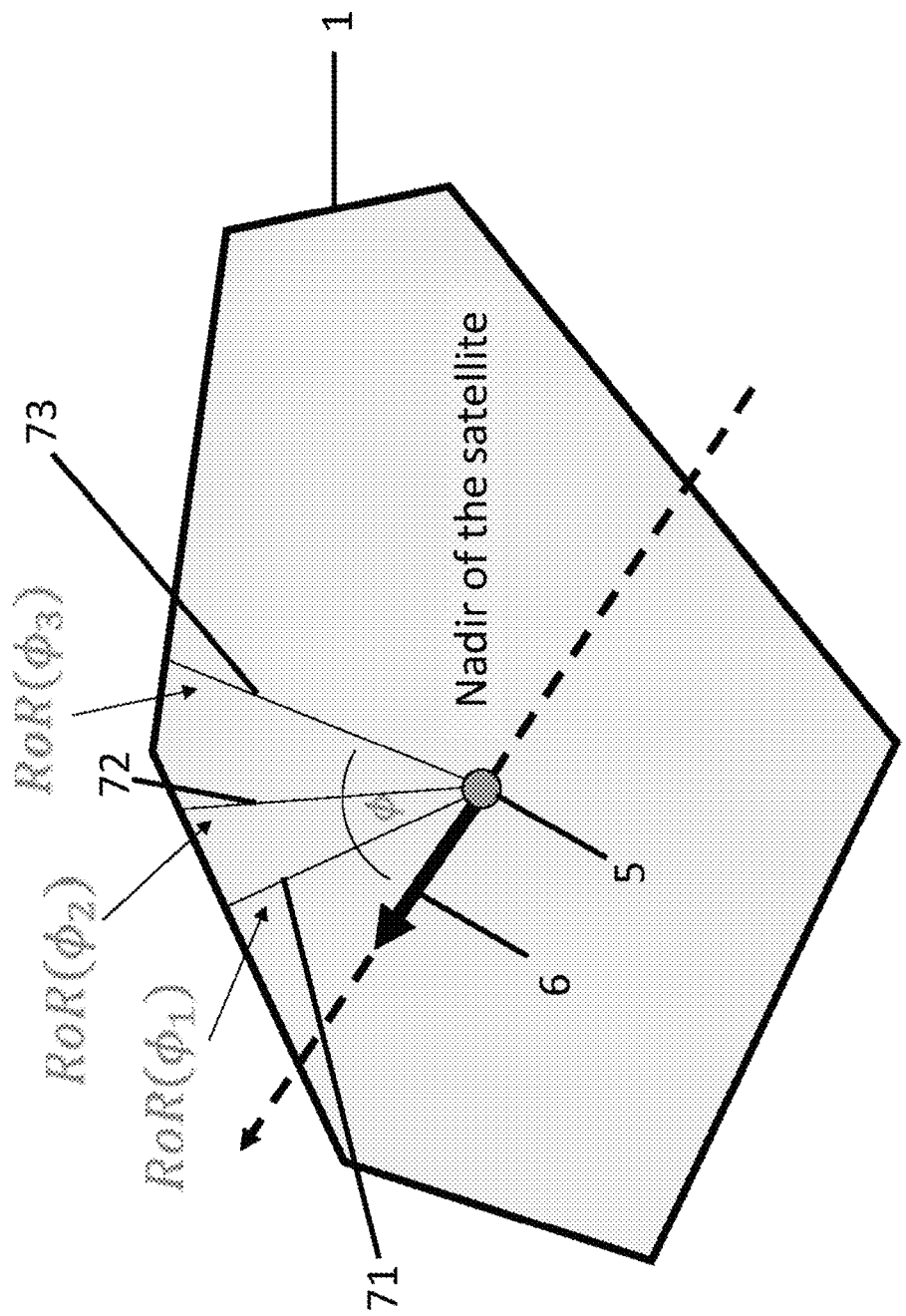
FIG. 2 shows a field of regard described by a polygon.

In FIG. 1A-1B, the region of regard 1 of the satellite 2 is approximated by an ellipse. FIG. 2 shows an example which achieves greater accuracy. In this figure, the region of regard 1 is approximated by a polygon, i.e., a region enclosed by straight sections. In the example shown in FIG. 2, three directions of view 71, 72 and 73 are marked, which correspond to different angles $\varphi_1$, $\varphi_2$ and $\varphi_3$. The corresponding view radius $R_{sensor}(\varphi)$ or RoR ($\varphi$) results in each case as the distance between the satellite reference point 5 and the corresponding portion of the polygon in the direction 71, 72 or 73, i.e., between the satellite reference point and the point of intersection of a straight line extending in the corresponding direction and the polygon. Since a polygon is technically usually defined by its vertices, these can also be used directly as anchor points for determining RoR.

Figure 3:
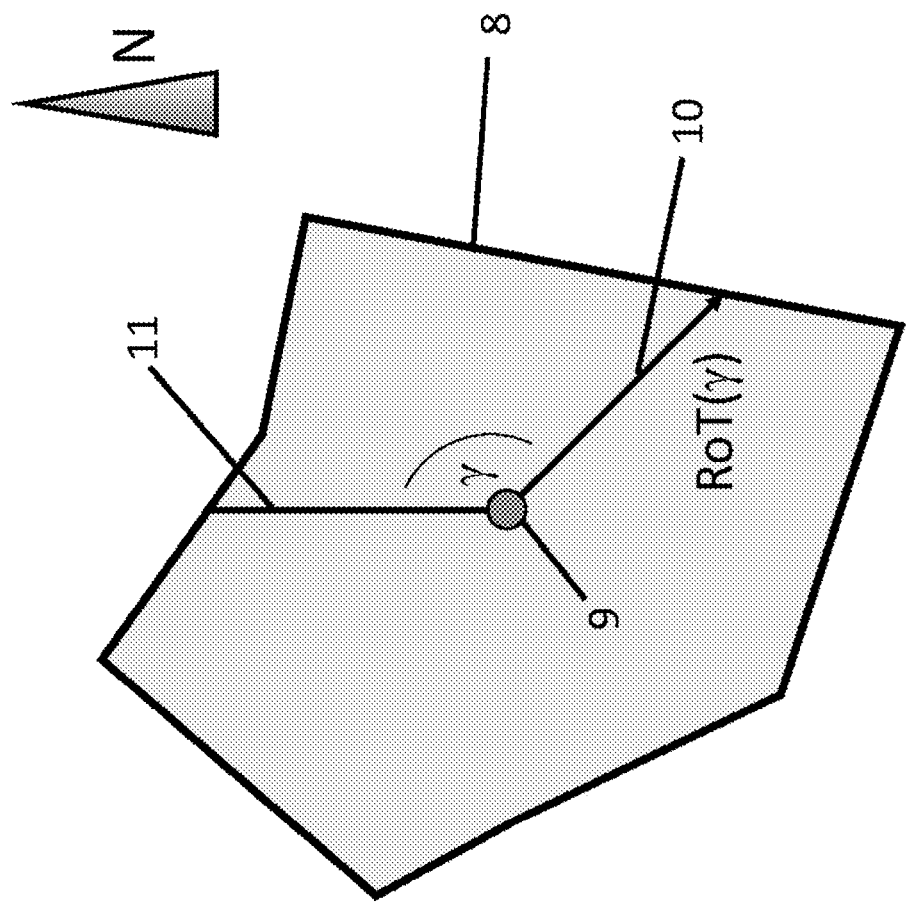
FIG. 3 shows a target region described by a polygon.

FIG. 3 shows an example of a target region, which represented by a polygon here. In the example shown, the polygon is composed of six sections, which enclose the target region 8. A direction 10 directed towards the satellite position point 5 is indicated here as the angle $\gamma$ in relation to a reference direction 11, the north direction here, about a target reference point 9. From the angle $\gamma$, an extension RoT($\gamma$) of the target region in the direction of the angle can then be determined starting from the target reference point 9. In this case, the extension in the direction of the angle $\gamma$ is the extension in the direction which is at the angle $\gamma$ to the reference direction 11. This extension RoT($\gamma$) is the distance between the target reference point 9 and the polygon 8 in said direction in the direction of the satellite position point 5.

Figure 4:
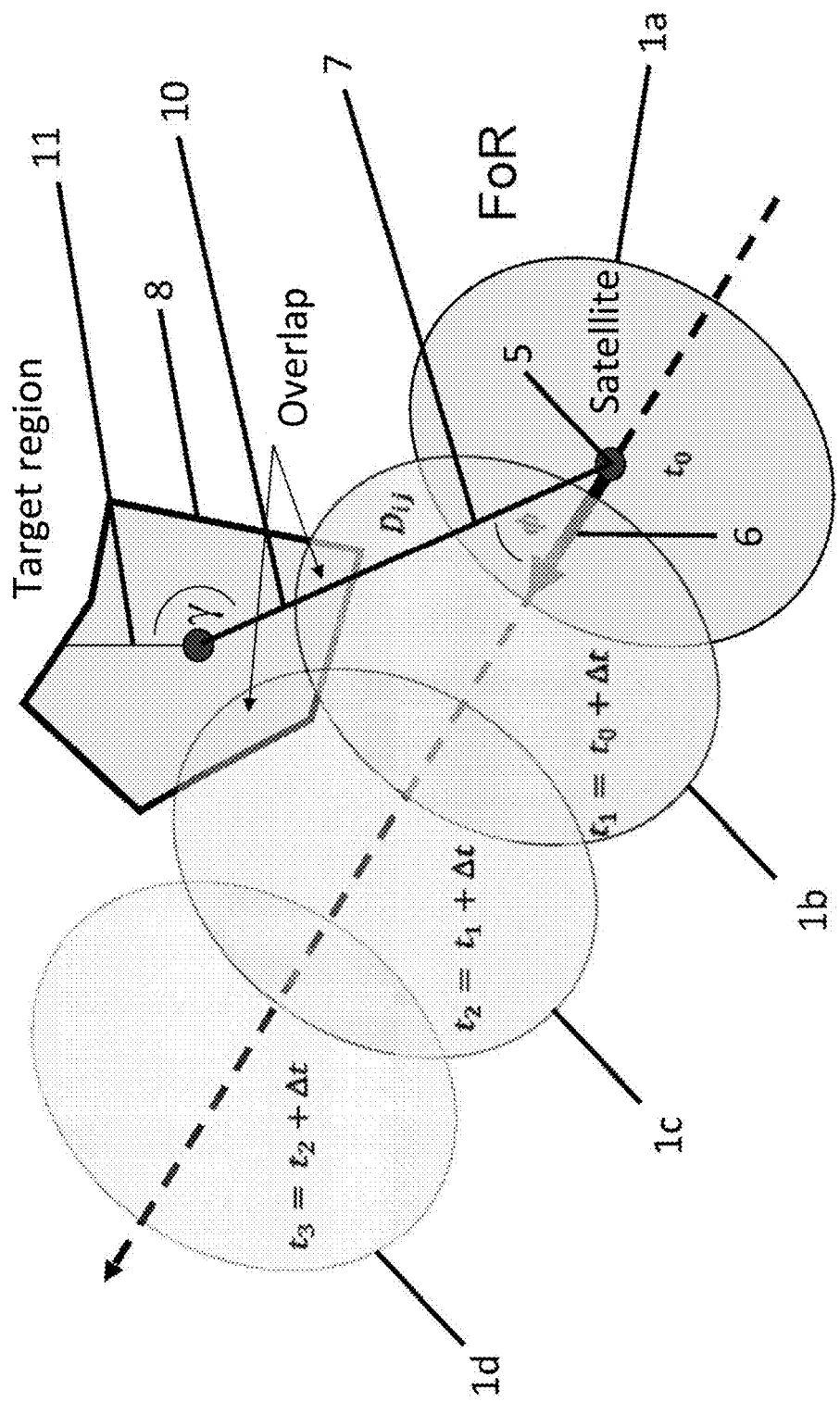
FIG. 4 shows a field of regard of a satellite over time, as well as a target region.

FIG. 4 shows four regions of regard 1a, 1b, 1c, 1d at different points in time $t_0$, $t_1$, $t_2$ and $t_3$ during which the satellite is moving. During the points in time $t_1$ and $t_2$, the region of regard 1 of the satellite overlaps a target region 8. From the position of the nadir 5 of the satellite, the target reference point 9 appears in the direction of the angle $\phi$ relative to the propagation direction 6 of the satellite. From the point of view of the target reference point 9, the nadir 5 of the satellite appears at the angle $\gamma$ relative to the north direction 11. The distance between the satellite reference point, i.e., the nadir 5, and the target reference point 9 is denoted $D_{ij}$ 7 in FIG. 4. At a given position of the satellite 2, the satellite is then capable of accessing the target region 8 when the region of regard 1 overlaps the target region 8. This may for example be determined by the distance $D_{ij}$ being determined. If this distance $D_{ij} \leq \text{RoT}(\gamma) + R_{sensor}(\phi)$, the region of regard 1 and the target region 8 overlap and the sensor is capable of accessing the target region 8. Therefore, for example, the sensor can measure measured values from the target region 8 or capture the target region 8, for example in the form of an optical sensor. In the example shown in FIG. 4, this is the case at the points in time $t_1$ and $t_2$, whereas at the points in time $t_0$ and $t_3$ there is no overlap between the region of regard 1 and the target region 8. If, therefore, the method according to the invention is performed at the points in time $t_1$ or $t_2$, the result would be that there is access possibility. At the points in time $t_0$ or $t_3$, however, the result would be that there is no access possibility.

As shown in FIG. 4, the method can be carried out such that it is determined, in the manner according to the invention, at each of a plurality of points in time $t_0$, $t_1$, $t_2$, $t_3$, whether there is the access possibility. In this way, it can be determined when there is the access possibility; in this case, this is at the points in time $t_1$ and $t_2$. In the example shown, the points in time are each spaced apart from one another in time by an interval $\Delta t$. Since the method according to the invention allows for very rapid calculation, $\Delta t$ can be selected to be very small. If the method is to be further accelerated, $\Delta t$ can be increased. It is also possible to dynamically adapt the increment $\Delta t$ by it being scaled with the difference between the distance $D_{ij}$ and the radius sum RoT ($\gamma$)+$R_{sensor}(\phi)$). For a large difference, large increments can be selected, and for small differences, narrower increments can be selected.

Figure 5:
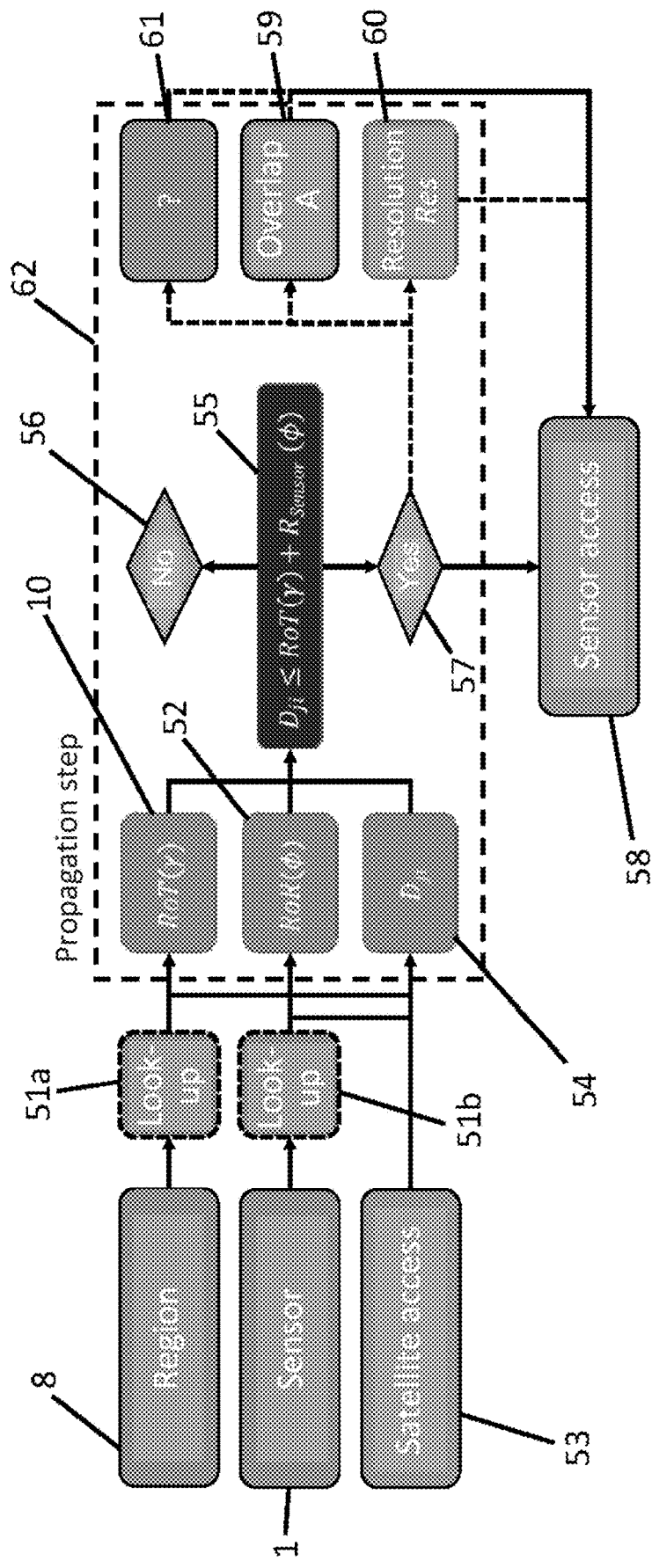
FIG. 5 is a schematic view of an example of the method according to the invention.

FIG. 5 schematically shows the method according to the invention. In this figure, the target region 8 as well as sensor parameters (resolution, field of view, etc.) are predetermined. This results in an angle $\gamma$ for the target region 8, as described above, and an angle $\phi$ for the region of regard 1 of the sensor. By means of the angle $\gamma$, the extension RoT($\gamma$) 10 can be identified using a look-up table 51a, for example. A view radius $R_{sensor}(\phi)$ 52 can be determined from the angle $\phi$ by means of another look-up table 51b and the current orbit altitude 53 as well as the ROR ($\phi$) 52. It is also predetermined, as a satellite access possibility 53, whether there is a line of sight between the satellite and the target region 8, for example the target reference point 9. In a step

54, the distance (at a given time) between the satellite reference point 5 and the target reference point 9 can be determined as $D_{ji}$. A comparison 55 is then performed in which it is determined whether $D_{ji} \leq \text{RoT}(\gamma) + R_{sensor}(\phi)$. If this is not the case, it can be determined as a result 56 that there is no possibility for accessing the target region. If, however, this condition is fulfilled, it can be determined as a result 57 that it is possible for the sensor to access the target region. Sensor access 58 can therefore take place. If the decision 57 shows that there is access possibility, in a step 59, an area of the overlap region A and/or a resolution 60 can thus optionally also be determined. Other possible variables 61 characterising the sensor access can thus optionally also be determined.

The dashed boxes in FIG. 5 indicate which steps are performed for each of the propagation steps, as shown in FIG. 4, for example. It is advantageous for RoT ($\gamma$) 10 and RoR ($\phi$) 52 to be able to be obtained by using look-up tables 51a, 51b, for example, since they only require a few calculations that can be performed very rapidly in the propagation step 62. In this way, the method can be performed very rapidly.

Figure 6:
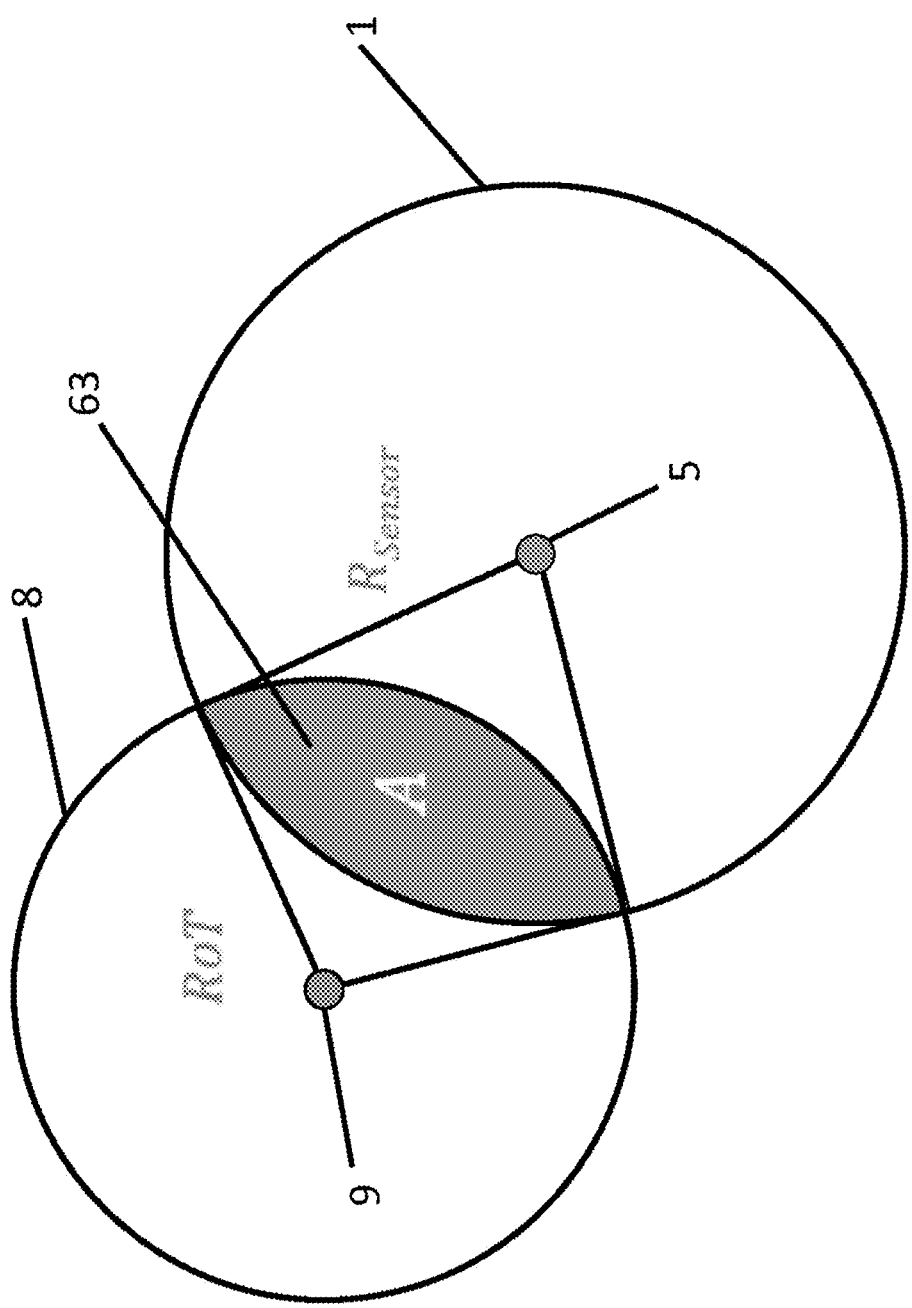
FIG. 6 is a schematic view of a calculation of an overlap.

FIG. 6 shows an example of how the area of an overlap region 63 between the target region 8 and the region of regard 1 can be estimated. Here, both the target region 8 and also the sensor region of regard 1 can advantageously be approximated by a circle. The overlap area between two circles can be calculated as described above, with it advantageously being possible to assume that the region of regard and the target region extend on a planar surface. For most applications, the accuracy of the overlap is not crucial, since it is only a rough estimation of whether the overlap is even large enough to be of use for the intended application.

In the following, an example of a procedure according to the invention will be described again in detail.

The following information can be predetermined for the calculation of the access characteristic of a sensor:

The movement of the satellite, on board which the sensor is positioned, specifically its coordinates when the satellite goes above or falls below the horizon (for propagation with state of the art software).

The period of time in which the access analysis is intended to take place. Normally, the period of time is in the range of a few days, since the accuracy of the TLEs decreases over time (approximately 1-2 seconds of accuracy lost per 48 hours).

The region in which the sensor access is intended to be analysed. This is represented by a polygon, for example.

The sensor characteristics: geometry of the sensor area on the ground at a reference altitude of the satellite.

Depending on the application, optionally other physical models, for example for the elevation or atmosphere or the maximum sensor resolution in the nadir.

In a first step, the satellites to be observed are propagated and the visual contact between the satellite and target region is calculated. This calculation is geometrically less challenging and can be carried out using existing software solutions (e.g., Orekit or STK). Specifically, the temporal and spatial coordinates of the satellite are calculated for when it appears over the horizon and disappears behind the horizon again from the view of the target region.

Within a software implementation, the access to the geometric centroid of the target region can be used as a starting point therein, for example. If the extension of the target region is large enough that it would be expected that sensor access would be obtained upon access at the centroid of the region, a plurality of points, e.g., on the contour of the target region, can instead be incorporated into the calculation. The step of satellite propagation and determining the start and end coordinates of the satellite access (line of sight present between satellite and target region) are part of the prior art.

The instances of satellite access obtained (position and time of start and end of each access) are forwarded in a second step together with the sensor characteristics for sensor propagation and calculation of the coverage. This takes place e.g., incrementally between the starting point and end point of the satellite access (position of the satellite with longitude and latitude as well as orbit altitude). In this process, the position of the satellite is propagated in time increments between the start and end of the satellite access and, for each time increment, it is calculated by means of the algorithm set out below whether there is an overlap between the sensors on board the satellite and the target region. It is noted at this point that there are a range of options for reducing the number of propagation steps and thus further accelerating a software implementation. Therefore, for example by using a Runge-Kutta method, the increments can be dynamically adapted by an estimation being made for the first contact between the sensor field of view and the target area after the first pair of increments.

Before the algorithm is discussed, two terms that are important in this context will be briefly explained: the field of view (FoV) and the field of regard (FoR). The point located directly below the satellite is called the "nadir". At a particular point in time, the sensor is aligned in a defined direction, and the projection of the sensor onto the Earth's surface, i.e., its current field of view, is called the FoV. Since the satellite and the sensor can usually change their alignment, the position of the FoVs can change accordingly. The integral of all the possible FoVs is called the FoR and has a different form depending on the sensor type.

In the case outlined, the FoR can be determined by two parameters, the short $\text{RoR}_{along}$ and long $\text{RoR}_{across}$ semi-axes of the ellipse shown. The reference direction is e.g., the propagation direction of the satellite here.

In FIG. 1A-1B, the FoR is indicated as an ellipse, and more generally it is any polygon (FIG. 2). By using polar coordinates, such a polygon can be geometrically approximated.

The following geometric simplifications, which drastically reduce the computing complexity for the sensor contact, are advantageous.

1. The sensor area is reduced to a direction-dependent and altitude-dependent parameter. If the angle $\varphi$ and the current altitude a of the satellite between the target region and the propagation direction of the satellite are known, the corresponding sensor radius $R_{sensor}$ can thus be immediately calculated using $\text{RoR}(\varphi)$.

$$R_{sensor}(\varphi) = RoR(\varphi) a / a_{ref}$$

where $$RoR(\phi) = \sqrt{(R_0 R_{across} \sin\phi)^2 + (R_0 R_{along} \cos\phi)^2}$$

in the case of the ellipse as shown in FIG. 1A-1B. The radius is scaled with the reference altitude of the satellite $a_{ref}$ here. The transfer into polar coordinates has the advantage that a refinement of the resolution (by reducing the angular increments) has a linear effect on the computing complexity. In network-based methods, the dependency is quadratic.

2. Analogously thereto, the description of the target region R, is reduced to an angle-dependent parameter, which reduces the radius of target (RoT). The angle is e.g., measured between the north direction and the satellite position.

With a software implementation, RoR($\varphi$) and RoT($\gamma$) only need to be determined once at the start of the calculation and can e.g., be retrieved by using a look-up table without being calculated again. Interpolation can then be carried out between individual table values at angles in order to obtain greater accuracy.

3. In order to identify an overlap between the sensor Sj and the target region Ri, the distance $D_{ji}$ between the projected satellite position on the Earth's surface and the reference point (e.g., geometric midpoint) of the radius RoT of the target region is determined. Here, the distance is e.g., calculated along the corresponding great circle of the globe, e.g., using Vincenty's algorithm [T. Vincenty, "DIRECT AND INVERSE SOLUTIONS OF GEODESICS ON THE ELLIPSOID WITH APPLICATION OF NESTED EQUATIONS," Surv. Rev., vol. 23, no. 176, pp. 88-93, 1975.]

If it is smaller than the sum of $R_{sensor}$ and RoT at the corresponding angle, both areas overlap.

There is therefore access if $D_{ji} \leq RoT(\gamma) + R_{sensor}(\varphi)$.

It should again be emphasised that the geometric approximation of the projected sensor area and the target region area only needs to be carried out once before the sensor propagation is performed. For each time increment, only the angles $\gamma$ and $\varphi$ spare then determined and, on the basis of this and the current altitude a, it is identified whether there is an overlap.

The approach is again schematically shown in FIG. 4. FIG. 4 illustrates the propagation here, and FIG. 5 shows a programmatic implementation.

With regard to FIG. 5: the input data are set out on the left-hand side. The compilation of a look-up table 51a, 51b (Lookup) is optional. For each propagation step (dashed box 62), it is determined whether there is access from the target radius 10, the sensor radius 52 and the distance 54 between the satellite and the region. Other parameters, such as overlap A or resolution Res, are optionally determined. The instances of access are then output for further processing.

For some applications, it may be advantageous to determine other characteristics of the sensor contact, e.g.:

1. The size of the overlap A can be estimated by the intersection between two circles having the radii $R_{sensor}$ ($\varphi$) and RoT ($\gamma$) (FIG. 6). The overlap comes about as the area of the intermediate lens-shaped portion as a function of the distance between the two centres of the circles $D_{ji}$, which has already been calculated in the previous step 54.

Depending on the complexity of the surface geometry, the overlap can be estimated more or less accurately as a result. Since the projected position of the satellite is subject to uncertainties anyway, the accuracy of the overlap is not usually crucial. It can, however, give an important indication of the overlap to be expected and especially of whether this only relates to a small part of the target region and is therefore possibly not of any interest to a user.

2. In optical sensors, the resolution scales linearly with the optical path length. This can be estimated from $D_{ji}$ and orbit altitude in relation to reference values $Res_{Ref}$ and $\alpha_{Ref}$.

$$Res = \frac{Res_{Ref}\sqrt{D_{ji}^2 + a^2}}{a_{Ref}}$$

The advantages of the invention over existing methods are the following, for example:

1. Implementation: the solution is simple to implement in software and has high parallelisability.
2. Quality: compared with previous analytical methods, complicated target-region and field-of-view geometries can also be processed.
3. Detail: compared with analytical methods, detailed time-dependent and location-dependent statements can be made. It is possible to calculate important physical parameters, such as the resolution or level of coverage that can be achieved, in a simple manner.
4. Scalability: By contrast with numerical methods, the computing time does not increase quadratically, but linearly with the size of the target region, while the accuracy is maintained.
5. Low complexity: Reducing the number of characterising variables to three distances allows the calculation speed to be drastically increased compared with network-based, numerical methods.
6. Universal applicability: Simplifying the sensor model allows many satellites to be implemented rapidly, without software having to be accordingly adapted.
7. Statements in real time: By simplifying the calculations, statements can be made in real time, even taking into account hundreds of satellites, which enables new and improved applications.

Figure 7:
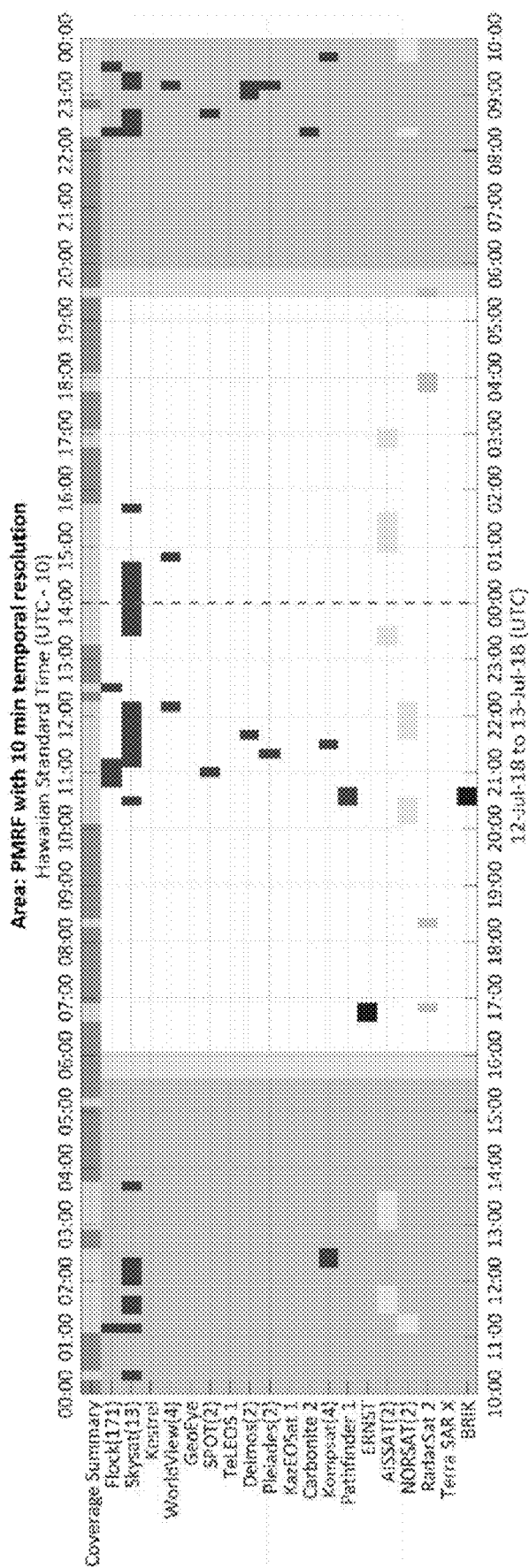
FIG. 7 is an exemplary view of access capabilities of a large number of satellites over the course of a day.

FIG. 7 shows the access capabilities of a range of satellites plotted on the vertical axis over the course of a day, which is plotted along the horizontal axis. A triangle in the view in FIG. 4 means that the corresponding satellite has the possibility of accessing the target region, which is a location on Hawaii here, at the corresponding time at which the triangle is shown. The grey background shows the nighttime period, while the non-grey background shows the $$A_1 = RoT_{Avg}^2 \mathrm{acos}\left(\frac{D_{ji}^2 + RoT(\gamma)^2 - R_{Sensor}(\phi)^2}{2D_{ji}RoT(\gamma)}\right)$$

$$A_2 = RoR^2 \mathrm{acos}\left(\frac{D_{ji}^2 + R_{Sensor}(\phi)^2 - RoT(\gamma)^2}{2D_{ji}R_{Sensor}(\phi)}\right)$$

$$A_3 = (-D_{ji} + RoT(\gamma) + R_{Sensor}(\phi))(D_{ji} + RoT(\gamma) - R_{Sensor}(\phi))(D_{ji} - RoT(\gamma) + R_{Sensor}(\phi))(D_{ji} + RoT(\gamma) + R_{Sensor}(\phi))$$

$$A = A_1 + A_2 - \frac{1}{2}\sqrt{A_3}$$

daytime period. The times are given in UTC. The uppermost line in FIG. 7 below the times states the summary of all the access capabilities. It can be immediately established whether one of the satellites or none of the satellites has access.

Owing to the high speed of the method, it can be used for incremental optimisation methods in order to simulate new constellations and adapt them optimally. Owing to the universal adaptability of the method to various sensor configurations, various models can be run rapidly and adapted accordingly.

Furthermore, there are many applications in which time criticality is of overriding importance. This may be the case when assisting military deployment or in crisis and catastrophe management. The method reliably gives decision-makers a rapid overview of potentially available satellite data as a well-founded information base.

An important subject in space technology, as in other technology sectors, is equipping satellites with artificial intelligence. In this context, a resource-efficient algorithm can also be used directly on board a satellite in order to optimise the Earth observation performance, for example using swarms of intelligent microsatellites, with regard to repetition rate and coverage. Therefore, it would be possible, inter alia, a) to establish redundancy and to maintain the coverage when parts of the swarm become inoperative, b) to automatically increase the repetition rate over time over a particular region in the event of a crisis or c) to automatically adapt the task distribution under changing boundary conditions.

The invention claimed is:

1. A method for determining the possibility of a sensor contained in a satellite to access a target region,
   wherein
   at least one position of the satellite is identified,
   and if there is a direct line of sight between the satellite and the target region,
   an angle $\varphi$ is determined between a satellite reference direction and a target direction directed towards a target reference point in the target region about a satellite position point dependent on the position of the satellite,
   a view radius $R_{sensor}(\varphi)$ of the satellite in the direction of the angle $\varphi$ is determined starting from the satellite position point,
   an angle $\gamma$ is determined between a reference direction and a direction directed towards the satellite position point about the target reference point,
   an extension RoT ($\gamma$) of the target region in the direction of the angle $\gamma$ is determined starting from the target reference point, and
   it is determined that there is access possibility if a distance between the satellite position point and the target reference point is less than or equal to the sum of the view radius $R_{sensor}(\varphi)$ of the satellite and the extension RoT ($\gamma$) of the target region in the direction of the angle $\gamma$.

2. The method according to claim 1, wherein the viewing radius $R_{sensor}(\varphi)$ of the satellite is determined by representing a region of regard, FoR, which is a region of the Earth's surface or of a reference ellipsoid which can be reached by the sensor from the position of the satellite, by an ellipse or a polygon and the distance between the satellite reference point and the ellipse or the polygon in the direction of the angle $\varphi$ is determined as the view radius $R_{sensor}(\varphi)$.

3. The method according to claim 2, wherein the view radius $R_{sensor}(\varphi)$ is determined by identifying a reference view radius RoR ($\varphi$) from a table or function in which values of RoR are assigned to values of the angle $\varphi$ for a reference altitude $a_{ref}$ of the satellite, and calculating the view radius $R_{sensor}(\varphi)$ from the reference view radius RoR ($\varphi$) for a current altitude a of the satellite as $R_{sensor}(\varphi) = RoR(\varphi) \cdot a/a_{ref}$.

4. The method according to claim 1, wherein the extension RoT ($\gamma$) of the target region in the direction of the angle $\gamma$ is determined by representing the target region as an ellipse or polygon and determining the distance between the target reference point and this ellipse or this polygon in the direction of the angle $\gamma$ as the extension RoT ($\gamma$).

5. The method according to claim 4, wherein the extension RoT ($\gamma$) of the target region is identified from a table or function in which values of the extension RoT of the target region are assigned to values of the angle $\gamma$.

6. The method according to claim 1, wherein the satellite reference direction is a propagation direction of the satellite and/or wherein the target reference point is the geometric centroid of the target region and/or wherein the satellite position point is the nadir of the satellite.

7. The method according to claim 1, wherein the angle $\gamma$ is determined between the north direction as a reference direction and a direction pointing from the target reference point towards a nadir of the satellite.

8. The method according to claim 1, wherein the position of the satellite is identified in a time-dependent manner by determining coordinates of the satellite at a first point in time, which is the point in time at which said satellite goes above the horizon or a later point in time, and at a second point in time, which is a point in time at which said satellite disappears behind the horizon or an earlier point in time later than the first point in time, each viewed from the target reference point, and the positions of the satellite are determined for a plurality of points in time between the first point in time and the second point in time, and wherein it is determined for the plurality of points in time whether there is the possibility for the access.

9. The method according to claim 1, wherein an overlap of a region of regard FoR of the satellite with the target region is determined as an overlap area of a circle having the radius $R_{sensor}(\varphi)$ about the satellite position point and a circle having the radius RoT ($\gamma$) about the target reference point.

10. The method according to claim 1, wherein a current resolution of the sensor Res is approximated as $$\mathrm{Res} = (\mathrm{Res}_{ref} \cdot \sqrt{(D^2 + a^2)})/a_{ref},$$

wherein $\mathrm{Res}_{ref}$ is a resolution of the sensor at a reference altitude $a_{ref}$ of the satellite, a is a current altitude of the satellite, and D is a distance on the Earth's surface or the reference ellipsoid between the target reference point and the current satellite position point.

11. The method according to claim 1, wherein the access possibility at at least one target point in time is determined by the position of the satellite being identified at the at least one target point in time as its position and the angle $\varphi$, the view radius $R_{sensor}(\varphi)$ and the angle $\gamma$ being determined at the at least one target point in time.

12. The method according to claim 1,
   wherein, after determining the position of the satellite, it is first determined whether there is the direct line of sight between the satellite and the target region and it is determined that there is no access possibility when there is no direct line of sight between the satellite and the target region or the target reference point.

* * * * *